No. 614,972. Patented Nov. 29, 1898.
W. F. O'BRIEN & D. S. KEITH.
MACHINE FOR CUTTING SHANK STIFFENERS.
(Application filed Oct. 2, 1897.)
(No Model.) 3 Sheets—Sheet 3.
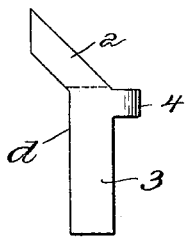
Fig. 6.
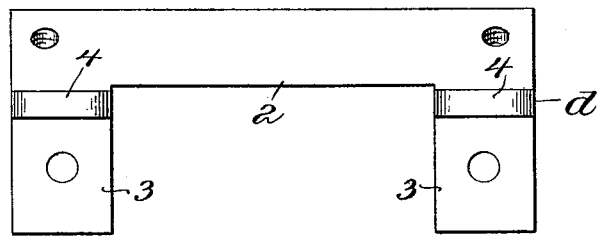
Fig. 5.
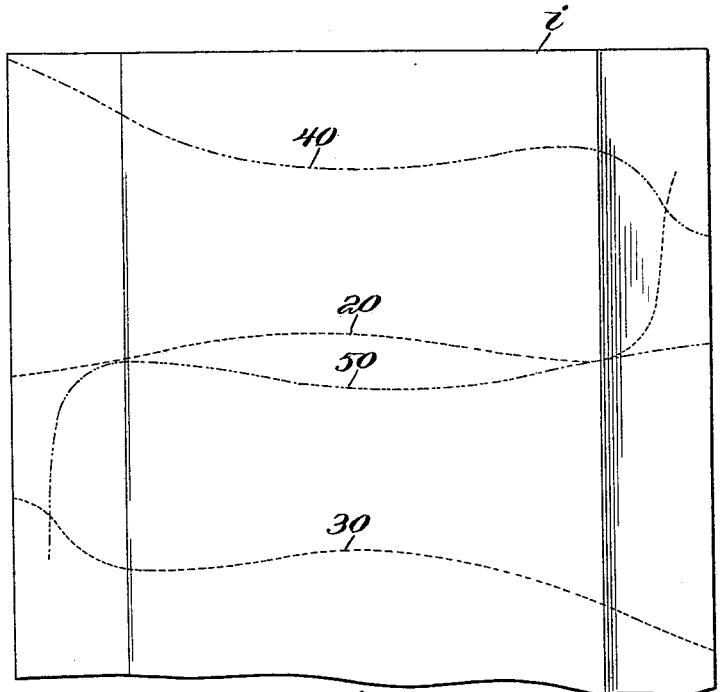
Fig. 7.
Fig. 8.
Witnesses:
Mary E Foster
Arthur W Randall
Inventors:
William F. O'Brien
Darius S. Keith
by B. J. Noyes

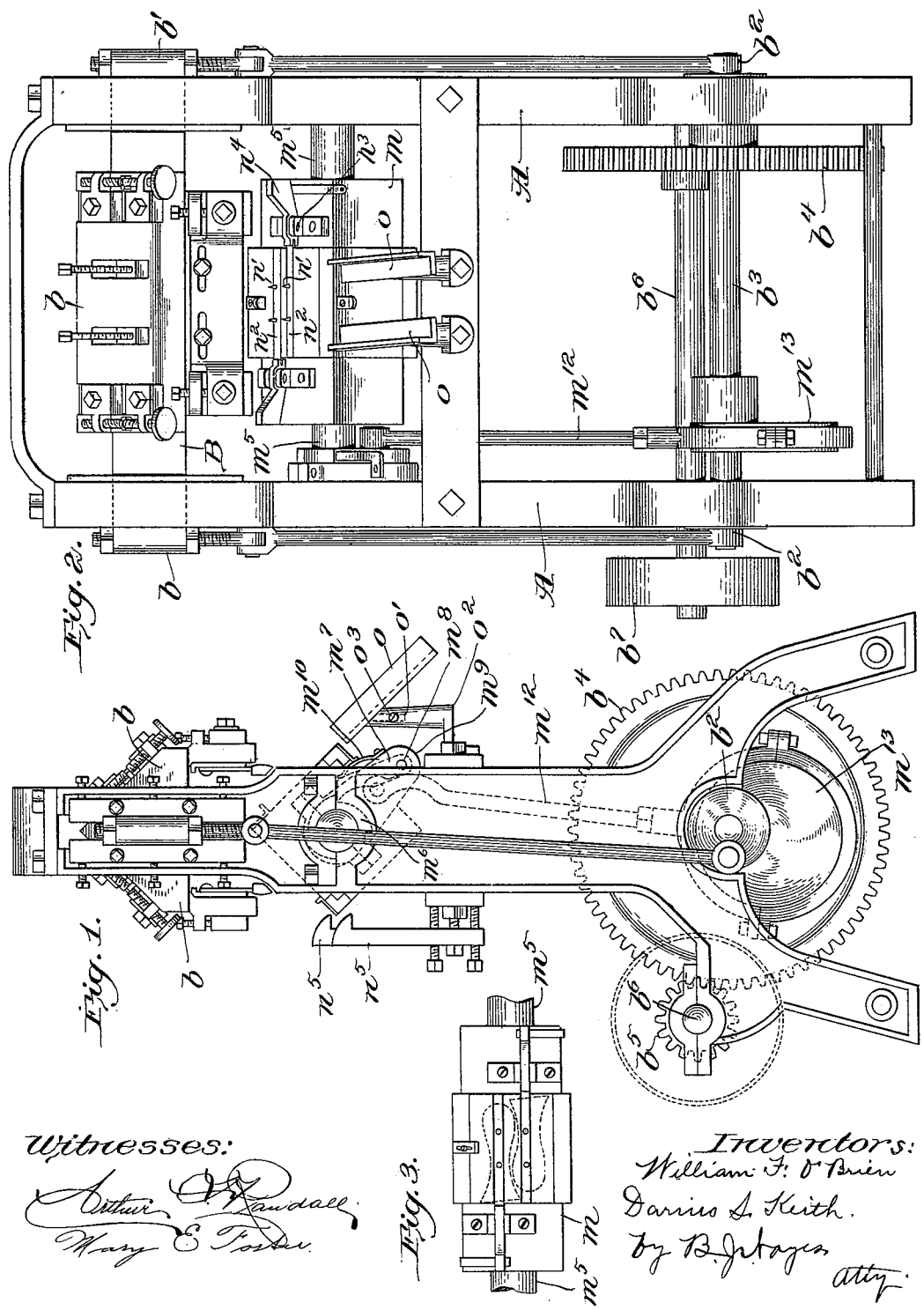

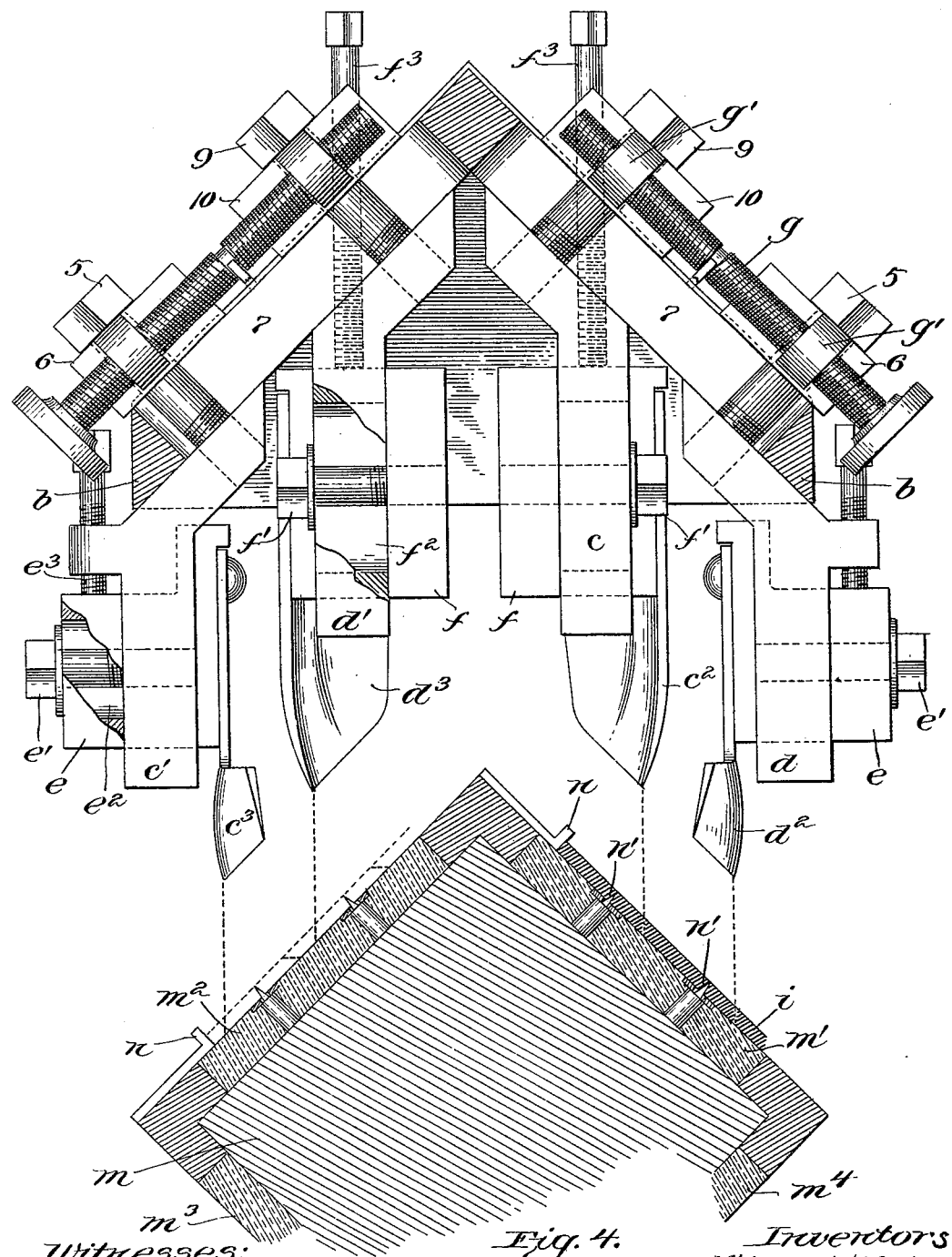

UNITED STATES PATENT OFFICE.

WILLIAM F. O'BRIEN AND DARIUS S. KEITH, OF WHITMAN, MASSACHUSETTS.

MACHINE FOR CUTTING SHANK-STIFFENERS.

SPECIFICATION forming part of Letters Patent No. 614,972, dated November 29, 1898.

Application filed October 2, 1897. Serial No. 653,932. (No model.)

*To all whom it may concern:*

Be it known that we, WILLIAM F. O'BRIEN and DARIUS S. KEITH, of Whitman, county of Plymouth, and State of Massachusetts, have invented an Improvement in Machines for Cutting Shank-Stiffeners, of which the following description, in connection with the accompanying drawings, is a specification, like letters and numerals on the drawings representing like parts.

This invention has for its object to improve the construction of machines for cutting shank-stiffeners, whereby the stiffeners may be cut from a prepared strip two at a time, although many features of our invention are applicable to a machine designed for cutting the stiffeners one at a time.

In accordance with this invention there may be one or two pairs of knives for cutting opposite sides of one or two stiffeners, two pairs being employed whenever it is desired to cut two stiffeners at a time. When two pairs of knives are employed, they may be constructed and arranged in such manner that the knives of one pair will cut one side of a stiffener and the opposite side of the next stiffener, and the other pair will in such case be constructed and arranged to cut the opposite sides of said stiffeners. The knives thus arranged will cut the stiffeners from a strip end for end.

Means are provided for moving the knives toward and from a bed upon which the strip is supported. The bed has preferably several work-receiving faces, although it may have but one, and said bed is made movable in such manner that said faces may be presented successively to the knives and also obliquely to said knives. By successively presenting said work-receiving faces to the knives first one side of a stiffener will be cut and then the opposite side of said stiffener, and by presenting said faces obliquely to the knives the stiffeners will be cut on a bevel, thereby obviating thereafter beveling the sides of the stiffeners.

For simplicity of construction as well as for the rapid operation of the machine we provide a bed with end journals whereby it may be rotated, and we also provide said bed with several work-receiving faces, four being herein shown, and means are provided for intermittingly rotating said bed to successively present said work-receiving faces obliquely to said knives.

The knives will be connected to a rising-and-falling carrier in order that they will all rise and fall together, and the bed having thereon the work-receiving faces is disposed relatively to said knives so that when one knife of a pair, or it may be one pair of knives, is cutting one side of one or two stiffeners, as the case may be, the other knife or pair of knives will cut the opposite sides of one or two stiffeners, as the case may be, which stiffeners have previously been cut by the aforesaid knife or knives, so that at each operation of the machine one or two stiffeners will be severed from the strip, according as to whether one pair or two pairs of knives are employed. By employing two pairs of knives arranged in accordance with this invention we are enabled to cut the stiffeners from a strip end for end without reversing the strip, and there is but little waste.

Means are provided for guiding the strip obliquely to the knives in order that one side of the stiffener may be made longer than the other, as it will be understood that the long-shank side of a shank-stiffener should be made longer than its short-shank side. Means are also provided for holding the stiffeners in place on the work-receiving faces of the bed while the knives act and while the bed moves. Means are also provided for discharging the completed stiffeners from the bed, which means is preferably automatically operated.

Figure 1 shows a right-hand end view of a machine for cutting shank-stiffeners embodying this invention; Fig. 2, a front elevation of the machine shown in Fig. 1; Fig. 3, a detail showing one work-receiving face of the bed with a discharging device thereon; Fig. 4, an enlarged detail showing a knife-carrier and two pairs of knives thereon and a cross-sectional view of the bed provided with four work-receiving faces; Fig. 5, a detail showing in front elevation one of the knife-holders removed from the cross-head or carrier; Fig. 6, an end view of the knife-holder shown in Fig. 5; Fig. 7, a plan view of a piece of the full-sized prepared strip from which the shank-stiffeners are cut, the dotted and broken lines representing two stiffeners cut end for end from the strip; and Fig. 8, a cross-section of the strip.

The main frame consists, essentially, of two uprights A A' and suitable cross-pieces connecting the same together.

B represents a cross-head or carrier which consists, essentially, of a central portion inverted-V-shaped in cross-section and open at the bottom and also hollow, thereby presenting two oblique portions $b\,b$, arranged at substantially right angles with relation to each other, and end portions $b'\,b'$, projecting in opposite ways from said central portion. The end portions $b'\,b'$ of said cross-head pass through ways provided in the uprights A A' and are adapted to slide up and down therein, and pinions connect said projecting end portions $b'\,b'$ with cranks $b^2\,b^2$, which are secured to the opposite ends of a shaft $b^3$, having its bearings in the uprights A A', said cranks being disposed so as to operate in unison, and thereby raise and lower the cross-head B. As a means of rotating said crank-shaft $b^3$ we have herein secured to said shaft a large toothed gear $b^4$, which is engaged by a pinion $b^5$, secured to the shaft $b^6$, also having its bearings in said uprights A A', said shaft $b^6$ being driven by a belt-pulley $b^7$.

To the central portion $b\,b$ of the cross-head or carrier the knife-holders are secured, and, as herein shown, two pairs of knife-holders are provided, one pair, as $c$ and $d$, being secured to one of said oblique portions $b$ and the other pair, as $c'\,d'$, being secured to the other oblique portion $b$.

The knife-holders $c'$ and $d$ (see Figs. 4, 5, and 6) each consist of an oblique cross-piece 2, having at each end a downwardly-extending leg 3 and also having a pair of outwardly-projecting ears or lugs 4, and said knife-holders are attached to the portions $b$ of the carrier by bolts 5, which pass through blocks 6, placed upon said portions $b$, and thence through transverse slots 7 in said portions $b$, and thence into the cross-piece 2 of the knife-holders. By loosening said bolts 5 the knife-holders $c'$ and $d$ may be adjusted transversely or toward and from each other. The knife-holders $c'$ and $d$ are attached to the lower or extreme edges of the portions $b\,b$, as best shown in Fig. 4.

Blocks $e$ are placed beneath the cross-pieces 2 of the knife-holders $c'$ and $d$, to which the knives $c^3$ and $d^2$ are secured adjustably by suitable bolts, and said blocks $e$ have each lateral projections at each end which overlie legs 3 3, and said blocks are secured in place by means of bolts $e'$, which pass through said overlying ends and into the legs 3 3. Slots $e^2$ are formed in said blocks $e$ through which the bolts $e'$ pass, so that said blocks may be adjusted vertically, and to determine such vertical adjustment adjusting-screws $e^3$ pass down through the ears or lugs 4 of the knife-holders and bear upon or engage said blocks. Thus it will be seen that when it is desired to adjust either knife toward or from the other the bolts 5 will be loosened and adjustment will be permitted by said bolts moving along in the slots 7 provided for them, and when it is desired to adjust said knives vertically the bolts $e'$ will be loosened and the adjusting-screws $e^3$ turned.

The knife $d^2$ will be shaped to cut one side of a shank-stiffener and the knife $c^3$ will be shaped to cut the opposite side of another shank-stiffener, as will be hereinafter more fully explained.

The knife-holders $c$ and $d'$ are constructed substantially the same as the knife-holders $d$ and $c'$, with the exception that the lugs or ears 4 are not provided—that is to say, they consist of a cross-piece 2, a downwardly-extending leg 3 3 at the ends thereof—and said knife-holders are attached to the portions $b\,b$ of the carrier in substantially the same way as the knife-holders $d$ and $c'$ are attached—that is to say, they are attached by means of bolts 9 9, which pass through blocks 10 10, resting upon said portions $b\,b$, and thence through the slots 7 in said portions $b\,b$, and thence into or engage the cross-pieces 2 of the knife-holders. By loosening the bolts 9 9 said knife-holders $c$ and $d'$ may be adjusted toward and from each other independently. The knife-holders $c$ and $d'$ have attached to them suitable blocks $f$, which are constructed substantially the same as the blocks $e$—that is to say, said blocks $f$ are formed or provided with projecting end portions which overlie the legs 3 3 of the knife-holders and are attached to said holders by bolts $f'$, passing through said blocks and legs, and for the purposes of vertical adjustment the legs 3 3 in this instance are formed or provided with vertical slots $f^2$, through which said bolts $f'$ pass, and such vertical adjustment is determined by bolts $f^3$, which pass down through slots in said portions $b\,b$, and thence through the knife-holders $c$ and $d'$ and engage the blocks $f\,f$. To the blocks $f\,f$ the knives $c^2$ and $d^3$ are secured, and said knives are shaped to cut the opposite sides of the shank-stiffeners, as will be hereinafter more fully explained. It will thus be seen that the knives $c^2$ and $d^3$ may be adjusted toward and from each other and also vertically in substantially the same way as the knives $d^2$ and $c^3$ are adjusted. For the purpose of facilitating the adjustment of the knives $d^2$ and $c^2$ toward and from each other a right and left threaded screw $g$ passes through lugs or ears $g'$, projecting from the blocks 6 and 10, said screw having a thumb-piece at one end by means of which it may be turned, and the knives $d^3$ and $c^3$ may be adjusted toward and from each other by a similar right and left threaded screw if desired. As the cross-head B, bearing the knives, rises and falls it will be seen that all the knives will rise and fall together.

The shank-stiffeners in accordance with this invention are designed to be cut from a strip of leather-board or other suitable material, and by referring to Figs. 7 and 8 $i$ represents the strip from which the shank-stiffeners are to be cut, it having its opposite edges upon one side beveled, as shown, and it is designed to cut two stiffeners at each operation of the machine, and, furthermore, it is designed that the sides of the stiffeners shall be cut on a bevel at approximately forty-five degrees.

$m$ represents a bed made quadrangular in cross-section and having four work-receiving faces $m'$ $m^2$ $m^3$ $m^4$, although such bed may be so made as to present more or less work-receiving faces. The bed $m$ has journals $m^5$ at the ends, adapting it to be rotated, and said journals have their bearings in the upright frames of the machine beneath the knives to thereby dispose the bed directly beneath the knives.

Secured to one of the journals $m^5$ is a ratchet-wheel $m^6$, (see dotted lines, Fig. 1,) which is engaged by a pawl $m^7$, pivoted at $m^8$ to a pawl-carrier $m^9$, mounted loosely on the journal $m^5$, said pawl $m^7$ being held pressed into engagement with the ratchet-wheel $m^6$ by means of a spring $m^{10}$.

The pawl-carrier $m^9$ is connected by a rod $m^{12}$ with an eccentric $m^{13}$, secured to the shaft $b^3$, and the parts are so arranged that at each revolution of said shaft $b^3$ the ratchet-wheel $m^6$ will be advanced one tooth, thereby intermittingly rotating the bed $m$. The bed $m$ is placed directly beneath the cross-head bearing the knives, and when formed with four work-receiving faces, as shown in Fig. 4, the ratchet-wheel $m^6$ will be formed with four teeth in order that the four work-receiving faces of the bed may be presented successively to the pairs of knives.

The bed is so disposed relatively to the knives as to present the work-receiving faces obliquely to the path of movement of the knives in order that the sides of the stiffeners may be cut on a bevel of, say, forty-five degrees.

Each work-receiving face has a guide $n$, against which the stock is pressed when fed to the machine, and each face also has several pointed pins $n'$, which are adapted to enter the stock to hold it in fixed position while being acted upon by the knives. There may be as many pins $n'$ as desired, and they may be located in any suitable way.

Discharging devices are provided for automatically removing the cut stiffeners from the work-receiving faces of the bed, and, as herein shown, said discharging devices consist of levers $n^2$, which are arranged lengthwise the work-receiving faces of the bed—that is, from side to side—and having perforations through them for the pins $n'$, and said levers are pivoted at $n^3$ and provided with cam-faced extensions $n^4$ at the opposite sides of their pivots, which are adapted to be acted upon by means of beveled-faced arms $n^5$, (see Fig. 1,) which are adjustably secured to the frame of the machine, said arms operating, when engaging the cam-faced extensions of the levers $n^2$, to turn said levers on their pivots $n^3$ and to throw off the stiffeners which are impaled upon the pins $n'$.

The strip $i$ may be fed to the bed in a straight line; but as it is desirable that the long shank side of a stiffener shall be longer than the short shank side said strip will be fed obliquely to be acted upon by the knives, and to facilitate thus feeding the strip $i$ and to vary the obliquity which may be required guides $o$, consisting of right-angular pieces set facing each other, are supported upon pins $o'$, (see Fig. 1,) which are set in posts $o^2$, secured to the frame of the machine, said pins being held in place by set-screws $o^3$, so that the guides may be swung on said pins as pivots and also adjusted vertically. It is obvious that many different forms and constructions of guides may be devised for thus obliquely feeding the strip $i$; but the form herein shown is simple and easily operated. The strip $i$, having been presented to the bed and guided by the oblique guide $o$, is brought into the position shown in Fig. 4, with its forward edge resting against the guide-strip $n$, and as the cross-head descends the knives $c^2$ $d^2$ will cut the strip on an angle or lines of severence, being represented in Fig. 7 by the dotted lines 20 and 30. The cross-head then rises, withdrawing the knives, and the bed is then turned one step to present the next work-receiving face obliquely to said knives $c^2$ and $d^2$, and the aforesaid operation is then repeated. As the bed thus turns one step the work-receiving face $m'$, bearing a portion of the strip $i$, with the lines of severance 20 and 30, formed by the knives $c^2$ and $d$, is presented obliquely to the knives $c^3$ and $d^3$, and upon the next descent of the cross-head bearing the knives said knives $c^3$ and $d^3$ will cut the opposite sides of the two stiffeners, as represented by the lines of severance 40 and 50. The two stiffeners thus cut are then discharged as the bed turns its second step, the cam-faced extensions $n^4$ being at such time brought into engagement with the bevel-faced arms $n^5$. When the knives $c^3$ and $d^3$ descend to cut the opposite sides of the two stiffeners, it will be understood that the knives $c^2$ and $d^2$ descend at the same time and cut the lines of severance 20 and 30 in the next two stiffeners, and as the operations continue at each descent of the cross-head two stiffeners will be severed from the strip. One of the knives—as $c^2$, for instance, which forms the line of severance 20—will be formed to cut the heel end of a stiffener, and the knife $d^2$, which forms the line of severance 30, will be provided with an extension which severs the piece completely from the strip $i$, and upon the other side of the machine the knife $d^3$, which forms the line of severance 50, will be formed to cut the heel end of a stiffener, and the knife $c^3$, which forms the line of severance 40, will be provided with an extension to completely sever the stiffener from the strip. Four knives are thus presented for the rapid operation of cutting the stiffeners; but it is obvious that one pair of knives only may be employed—as, for instance, the knives $c^2$ $c^3$ or the knives $d^2$ $d^3$—and, furthermore, we desire it to be understood that while it is preferable to form the bed with four work-receiving faces it is obvious that it may be formed with a single work-receiving face, which will be successively presented to the two pairs of knives $c^2$ $d^2$ and $c^3$ $d^3$, or any other number may be employed.

In Fig. 3 is represented in dotted lines stiffeners cut from the strip when the latter is presented obliquely to the severing devices.

So far as we are aware we are the first to employ a revolving bed for the stock, and consequently desire it to be understood that such feature, in combination with the knives, broadly comes within the scope of this invention.

We claim—

1. In a machine for cutting shank-stiffeners, a pair of knives for cutting the opposite sides of a stiffener, means for moving them, a bed having a work-receiving face, and means for moving said bed to present said face obliquely to first one and then to the other knife of the pair, substantially as described.

2. In a machine for cutting shank-stiffeners, two pairs of knives, one pair constructed and arranged to cut one side of a stiffener and the opposite side of another stiffener, and the other pair constructed and arranged to cut the opposite sides of said stiffeners, a bed having a work-receiving face, and means for moving said bed to present said face successively to said pairs of knives, substantially as described.

3. In a machine for cutting shank-stiffeners, two pairs of knives, one pair constructed and arranged to cut one side of a stiffener, and the opposite side of another stiffener, and the other pair constructed and arranged to cut the opposite sides of said stiffeners, a bed having a work-receiving face, and means for operating it to present said face obliquely to first one and then to the other pair of knives, substantially as described.

4. In a machine for cutting shank-stiffeners, a pair of knives for cutting the opposite sides of a stiffener, a bed having a work-receiving face, and means for moving it to present said face obliquely to one of said knives, and then obliquely to the other knife, substantially as described.

5. In a machine for cutting shank-stiffeners, a pair of knives for cutting the opposite sides of a stiffener, a bed having two work-receiving faces, and means for operating said bed to successively present said faces to said knives, substantially as described.

6. In a machine for cutting shank-stiffeners, a pair of knives for cutting the opposite sides of a stiffener, a bed having two work-receiving faces, and means for operating said bed to successively present said faces obliquely to said knives, substantially as described.

7. In a machine for cutting shank-stiffeners, a pair of knives as $d^2$, $d^3$, for successively cutting the opposite sides of a stiffener, and means for operating them, and a bed having two work-receiving faces arranged obliquely to said knives, substantially as described.

8. In a machine for cutting shank-stiffeners, two pairs of knives, one pair constructed and arranged to cut one side of a stiffener and the opposite side of another stiffener, and the other pair constructed and arranged to cut the opposite sides of said stiffeners, a bed having two work-receiving faces, and means for operating said bed to present both of said faces to said pairs of knives, substantially as described.

9. In a machine for cutting shank-stiffeners, two pairs of knives, one pair constructed and arranged to cut one side of a stiffener and the opposite side of another stiffener, and the other pair constructed and arranged to cut the opposite sides of said stiffeners, a bed having two work-receiving faces, and means for operating said bed to present said faces successively to said pairs of knives, substantially as described.

10. In a machine for cutting shank-stiffeners, a pair of knives for cutting the opposite sides of a stiffener, a bed having a number of work-receiving faces, means for turning said bed to successively present said faces to said knives, substantially as described.

11. In a machine for cutting shank-stiffeners, a pair of knives for cutting the opposite sides of a stiffener, a bed having a number of work-receiving faces, means for intermittingly rotating said bed to successively present said faces obliquely to said knives, substantially as described.

12. In a machine for cutting shank-stiffeners, two pairs of knives, one pair for cutting one side of the stiffener and the opposite side of another stiffener and the other pair for cutting the opposite sides of said stiffeners means for moving the knives of each pair simultaneously and a bed having two work-receiving faces arranged obliquely to said pairs of knives, substantially as described.

13. In a machine for cutting shank-stiffeners, two pairs of knives, one pair for cutting one side of a stiffener and the opposite side of another stiffener, and the other pair for cutting the opposite sides of said stiffeners, a bed having a number of work-receiving faces, and means for rotating it to successively present said faces to said pairs of knives, substantially as described.

14. In a machine for cutting shank-stiffeners, a pair of knives, one for cutting one side and the heel end of a stiffener, and the other for cutting the opposite side of said stiffener, and a bed having a work-receiving face, and means for moving said bed to present said face successively to said knives, substantially as described.

15. In a machine for cutting shank-stiffeners, a pair of knives, one for cutting one side of the shank-stiffener, and the other for cutting the opposite side and heel end of said stiffener, one of said knives having thereon an extension for severing the stiffener from a strip, and a bed having a work-receiving face, substantially as described.

16. In a machine for cutting shank-stiffeners, two pairs of knives, one pair for cutting one side and the heel end of a stiffener, and the opposite side of another stiffener, and the other pair for cutting the opposite side of the first-named stiffener, and the opposite side and heel end of the last-named stiffener, one knife of each pair being provided with an extension for severing the stiffener from the strip, and a bed having a number of work-receiving faces, and means for moving it to successively present said faces to said pairs of knives, substantially as described.

17. In a machine for cutting shank-stiffeners, a pair of knives for cutting the opposite sides of a stiffener, a bed having a number of work-receiving faces, means for operating it to successively present said faces to said knives, and means for moving said knives simultaneously toward and from two of said work-receiving faces, substantially as described.

18. In a machine for cutting shank-stiffeners, a pair of knives for cutting the opposite sides of a stiffener, a bed having two or more work-receiving faces, means for intermittingly rotating said bed to successively present said faces obliquely to said knives, and means for moving said knives simultaneously toward and from two of said oblique work-receiving faces, substantially as described.

19. In a machine for cutting shank-stiffeners, two pairs of knives, one pair constructed and arranged to cut one side of a stiffener and the opposite side of another stiffener, and the other pair constructed and arranged to cut the opposite sides of said stiffeners, a bed having two or more work-receiving faces, means for intermittingly rotating said bed to successively present said faces obliquely to said knives, and means for moving said knives simultaneously toward and from two of said oblique work-receiving faces, substantially as described.

20. In a machine for cutting shank-stiffeners, two pairs of knives, one pair constructed and arranged to cut one side of a stiffener and the opposite side of another stiffener, and the other pair constructed and arranged to cut the opposite sides of said stiffeners, and means for operating said knives, substantially as described.

21. In a machine for cutting shank-stiffeners, two pairs of knives, one pair constructed and arranged to simultaneously cut one side of a stiffener and the opposite side of another stiffener, and the other pair constructed and arranged to thereafter simultaneously cut the opposite sides of said stiffeners, and means for operating said knives, substantially as described.

22. In a machine for cutting shank-stiffeners from a strip, a bed upon which the strip is placed, two pairs of knives moving obliquely to said bed, one pair constructed and arranged to cut one side of the stiffener and the opposite side of another stiffener on a bevel, and the other pair constructed and arranged to cut the opposite sides of said stiffeners on an opposite bevel, and means for operating said knives, substantially as described.

23. In a machine for cutting shank-stiffeners from a strip, two pairs of knives, one pair constructed and arranged to cut one side of a stiffener and the opposite side of another stiffener and to sever the part forming the two stiffeners from the strip, and the other pair constructed and arranged to cut the opposite sides of said stiffeners and to sever the two stiffeners, substantially as described.

24. In a machine for cutting shank-stiffeners, two pairs of knives, one pair for cutting one side and the heel end of a stiffener, and the opposite side of another stiffener, and the other pair for cutting the opposite side of the first-named stiffener, and the opposite side and heel end of the last-named stiffener, one knife of each pair being provided with an extension for severing the stiffener from the strip, and means for operating said knives, substantially as described.

In testimony whereof we have signed our names to this specification in the presence of two subscribing witnesses.

WILLIAM F. O'BRIEN.
DARIUS S. KEITH.

Witnesses:
B. J. NOYES,
MARY E. FOSTER.